(No Model.)

C. D. P. GIBSON.
STORAGE BATTERY PLATE.

No. 388,668. Patented Aug. 28, 1888.

Witnesses,
Geo. W. Breck.
Eugene J. Reilly.

Inventor,
Chas. D. P. Gibson.
By his Attorneys
Pope Edgcomb & Terry.

UNITED STATES PATENT OFFICE.

CHARLES D. P. GIBSON, OF NEW YORK, N. Y.

STORAGE-BATTERY PLATE.

SPECIFICATION forming part of Letters Patent No. 388,668, dated August 28, 1888.

Application filed April 23, 1888. Serial No. 271,568. (No model.)

*To all whom it may concern:*

Be it known that I, CHARLES D. P. GIBSON, residing in New York, in the county and State of New York, a citizen of the United States, have invented certain new and useful Improvements in Storage-Battery Plates, of which the following is a specification.

The invention relates to the construction of storage-batteries or accumulators; and it consists in a novel form of supporting plates or electrodes, designed to permit of the application of the active material in a convenient manner, and to reliably retain it within the body of the plate while exposing it sufficiently to the action of the electrolytic fluid.

In carrying out the invention a sheet or plate of lead is perforated with holes, which may be rectangular in form. Into each of these holes there is dropped a button of lead, consisting of two flattened or notched heads united by a central stem of such length as to bring the heads flush with the general surface of the plate. The active material is then filled into the holes around the buttons, and when it becomes dry the buttons are retained in position by the active material. The heads of the buttons are of such shape and size as to touch the sides of the perforations at two or more points, while leaving sufficient space around them for the active material to be placed within the perforations.

Figure 1:
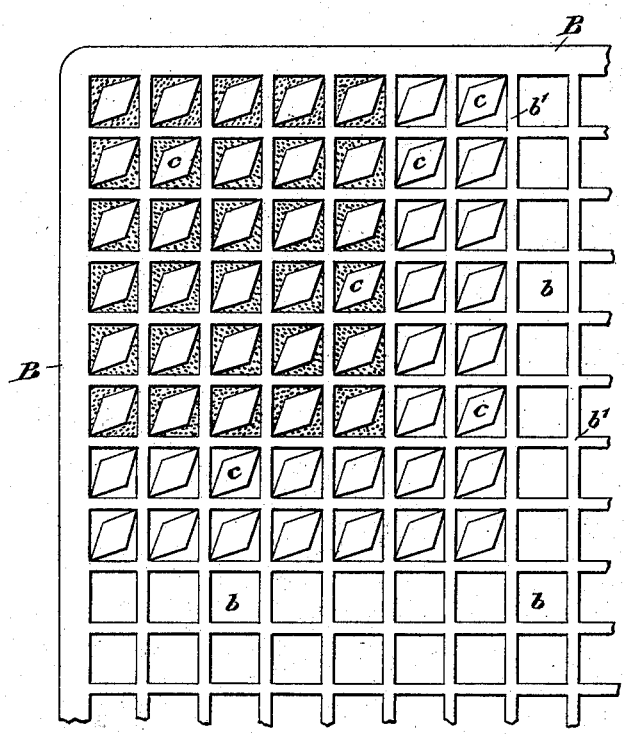
Figure 2:
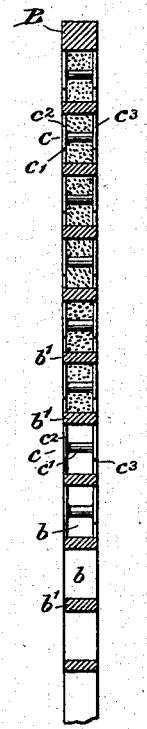

In the accompanying drawings, Figure 1 is a side elevation, and Fig. 2 is a transverse section, of a battery-plate embodying the features of the invention.

Referring to the figures, B represents a sheet of metal, preferably lead. Openings $b$ are formed throughout its entire surface. These openings may with advantage be rectangular in form, leaving a narrow web, $b'$. The plate is laid in a horizontal position upon a suitable block, and a button, $c$, is dropped into each opening. These buttons each consists of a central stem, $c'$, having flattened heads $c^2$ and $c^3$ at its respective ends. These heads may with advantage be diamond-shaped, as shown, or of other suitable form, so as to touch the sides of the perforations at two or more points, and yet not entirely close the openings $b$. They are of such length that the heads will be flush with the respective surfaces of the plate, or approximately so. After the buttons are in position active material is brushed over the plate and into the openings about the buttons in the usual manner. The active material is allowed to dry, and the plate is then in condition to be "trained."

Any suitable well-known form of active material may be employed for filling the plate. The plates thus constructed are employed in the usual manner.

As each mass of active material is firmly united to the metallic button, the latter greatly assists in holding it in place, whereby the plate is made more durable.

I claim as my invention—

1. A storage-battery plate consisting of a sheet of metal having transverse openings, a button of the same material extending through each opening and having an enlarged head at each end, and active material filling the spaces in the openings about the buttons.

2. A storage-battery plate consisting of a sheet of metal having openings, buttons placed in each opening, consisting of a central stem and enlarged heads, and active material placed in each opening about the said buttons.

3. A storage-battery plate consisting of a sheet of metal having rectangular openings, buttons of metal extending through each opening and consisting of central stems and flattened ends of diamond shape, said ends being approximately flush with the respective surfaces of the plate, and active material about the buttons.

In testimony whereof I have hereunto subscribed my name this 21st day of April, A. D. 1888.

CHARLES D. P. GIBSON.

Witnesses:
 DANL. W. EDGECOMB,
 CAROLINE E. DAVIDSON.